United States Patent
Zimpfer et al.

(10) Patent No.: US 7,617,841 B2
(45) Date of Patent: Nov. 17, 2009

(54) PRESSURE-DEPENDENT CHECK VALVE AND HYDRAULIC SYSTEM EQUIPPED THEREWITH

(75) Inventors: Michael Zimpfer, Ettlingen (DE); Andreas Hilgert, Sinzheim (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 214 days.

(21) Appl. No.: 10/559,549

(22) PCT Filed: May 27, 2004

(86) PCT No.: PCT/EP2004/005712

§ 371 (c)(1), (2), (4) Date: Mar. 20, 2006

(87) PCT Pub. No.: WO2004/109166

PCT Pub. Date: Dec. 16, 2004

(65) Prior Publication Data

US 2007/0056633 A1    Mar. 15, 2007

(30) Foreign Application Priority Data

Jun. 4, 2003   (DE) .................................. 103 25 202

(51) Int. Cl.
   *G05D 16/10*   (2006.01)
(52) U.S. Cl. ........................... 137/505.13; 137/505.28; 137/599.09
(58) Field of Classification Search ............ 137/505.81, 137/460, 461, 462, 599.09, 505.18, 505.13, 137/505.28
   See application file for complete search history.

(56) References Cited

U.S. PATENT DOCUMENTS

| 378,291 A | * | 2/1888 | Clarkson ............... 137/505.13 |
| 2,701,704 A | * | 2/1955 | Lawrence .................... 251/25 |
| 3,472,278 A | | 10/1969 | Arfelt |
| 3,971,404 A | * | 7/1976 | Quarve ....................... 137/462 |
| 4,874,011 A | * | 10/1989 | Canzano et al. ........ 137/505.13 |
| 2003/0019525 A1 | * | 1/2003 | Shen .......................... 137/505 |
| 2003/0019526 A1 | * | 1/2003 | Shen .......................... 137/494 |

FOREIGN PATENT DOCUMENTS

| DE | 19642837 | 1/1998 |
| FR | 2397578 | 2/1979 |
| GB | 102688 | 12/1916 |

* cited by examiner

Primary Examiner—Stephen Hepperle
(74) Attorney, Agent, or Firm—Benesch, Friedlander, Coplan & Aronoff LLP

(57) ABSTRACT

The inventive sliding valve (8) comprises a slide (18), which is mounted in a manner that enables it to move transversal to the passage channel (11). This valve is provided with an asymmetrical design whereby enabling the pressure prevailing in the passage channel (11) to reach a side of the slide (18) via suitable ducts (25, 26), whereas the other side is not subjected to any pressure or only to a constant low pressure. A pressure spring (29) works counter to the pressure and holds the slide (18) in the open position. In the event the fluid pressure prevails, the slide (18) is displaced into the blocking position in which it remains until the pressure falls below the switching limit once again.

19 Claims, 2 Drawing Sheets

Figures 4, 5:
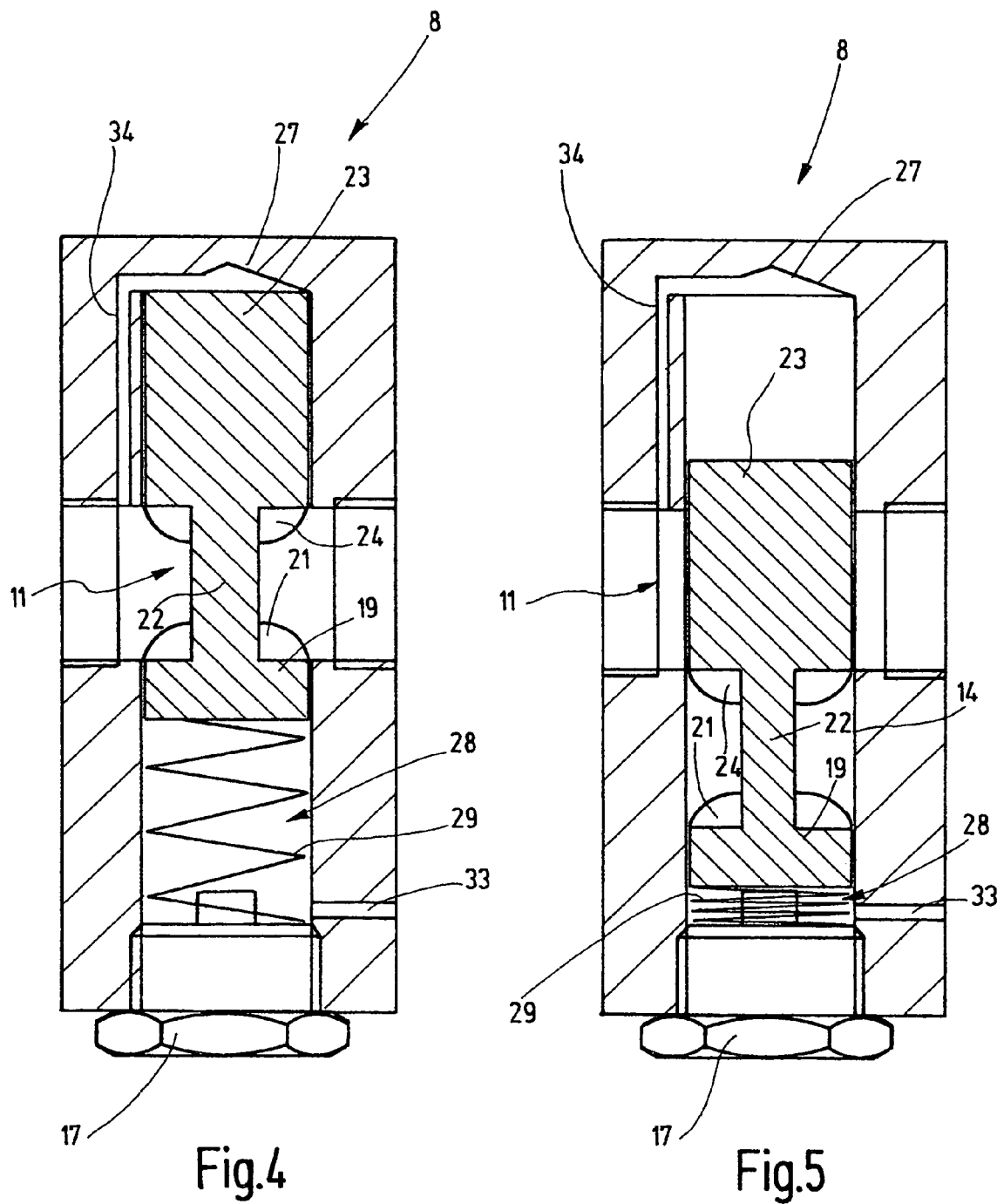

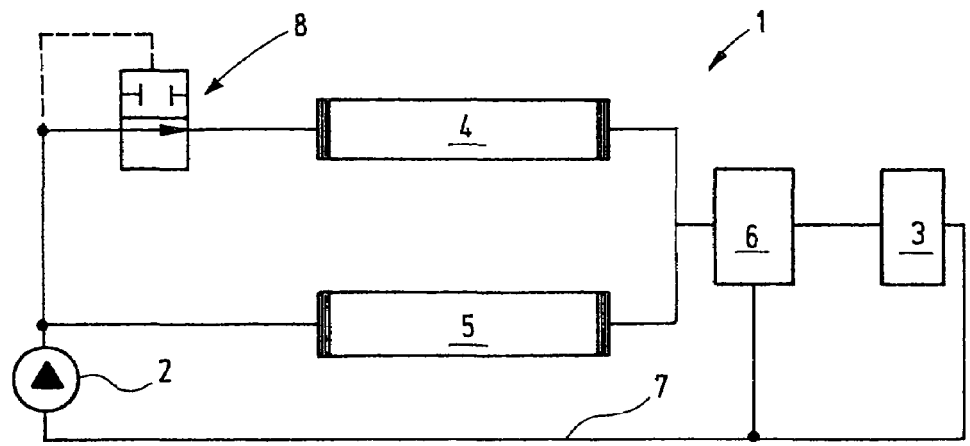
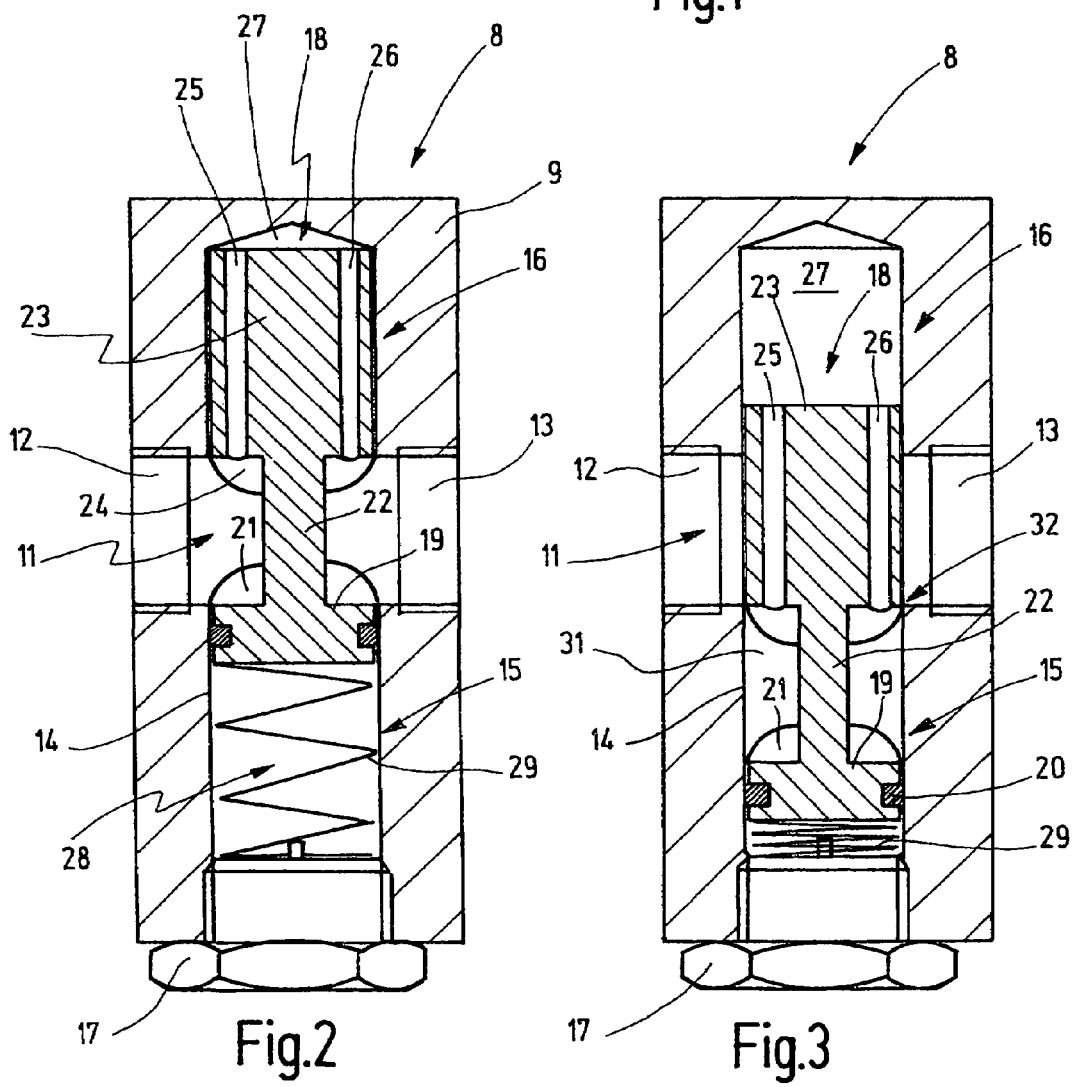

PRESSURE-DEPENDENT CHECK VALVE AND HYDRAULIC SYSTEM EQUIPPED THEREWITH

The invention relates to a slide valve for hydraulic systems, as well as to such a hydraulic system.

In hydraulic systems, it is frequently important to switch pressure-dependent or flow-dependent branches to be either connected or disconnected.

This is necessary, for example, in order to be able to enable various damping measures that are a function of various operating states.

For example, document DE 196 42 837 C1 discloses a hydraulic power-assisted steering system which is set up to provide the driver with a good feel of the road, i.e., on the one hand, to provide feedback on forces that act on the wheels and that can be felt in the steering wheel and, on the other hand, to prevent rough shocks caused by bumpy roads from reaching the steering wheel. To achieve this, the tie rod is provided with a hydraulic cylinder having two working chambers that, during straight-line driving, are connected with each by means of a control valve block and a short-circuiting line. This short-circuiting line contains two damper valves which are switched in series with respect to the short-circuiting action. These damper valves contain a disk-shaped valve-closing member that is arranged on an axially slidable pin and is immersed in oil. If the rate of flow exceeds a certain limit, this flow carries along the valve-closing member, forcing it against its associated valve seat. A pressure difference acting on the valve seat's support pin has the same effect. If the valve closure sits snugly on its valve seat, only relatively narrow throttle channels are still free, so that the fluid flow can be substantially reduced.

This valve responds to pressure differences, as well as to high flow rates. However, there are situations in which the valve is to switch only as a function of pressure, however not as a function of increasing flow. In addition, such valves are frequently expected to work without exhibiting any hysteresis or low hysteresis and display a well-defined response threshold in the long run.

Referring to this, it is the object of the invention to provide a simple and durable valve which switches as a function of pressure.

This object is achieved with a slide valve as in Claim 1. The inventive slide valve comprises a valve housing with a passage channel. In a direction transverse to said passage channel, a slide bore is provided in which a slide is seated.

Said slide has a head acting as the drive for the slide. Said head's corresponding effective area is aligned parallel to the flow passing through the passage channel. Referring to its opposite end, the slide has a blocking portion, so that the passage channel passes between two preferably essentially equally dimensioned and, e.g., annular surfaces of the slide. Both surfaces are aligned parallel to each other, so that a flow through the passage channel cannot generate a pressure difference and thus no resultant force that can act on the slide in closing direction. Consequently, the slide cannot be closed by the flow through the passage channel.

The head and the blocking portion divide one chamber, respectively, in the slide bore. While the chamber divided by the head preferably is not subjected to pressure, the chamber divided by the blocking portion preferably communicates with the fluid pressure of the passage channel. Consequently, the pressurized surfaces aligned in the slide's two opposite directions of movement have an overall different size, thus applying a force to the slide when the passage channel is pressurized. As a result, a strictly pressure-dependent slide valve is obtained. The chamber, divided by the blocking portion, communicates with the passage channel preferably via a channel branching off the passage channel at right angles. As a result of this, the chamber, divided by the blocking portion, is subjected to reduced static pressure as the flow through the passage channel increases, thus causing a force acting in opening direction of the slide. Only when this force or the spring force has exceeded the pressure prevailing in the passage channel, will the slide start to move in closing direction. As the flow decreases, the suction effect decreases, said suction effect having slightly reduced the pressure in the chamber, divided by the blocking portion, and having thus created a force acting in opening direction. As this force is ceasing, the slide valve closes more rapidly. In all, a switch-like closing of the slide valve is achieved.

The slide valve may be used, for example, in a hydraulic system in order to activate or deactivate various pressure-dependent dampers. These dampers preferably are resonators that are adjusted for various load-dependent and hence pressure-dependent pulsations.

Preferably, the chamber, divided by the head in the slide bore, may be provided with an outside vent. If an oil-tight bearing of the plunger in the slide bore is to be omitted, however, said chamber may be connected with an oil-collecting line via a relief line, which said oil-collecting line, for example, may be connected to the suction side of a hydraulic pump. In this way, special sealing measures may be omitted and the slide may be seated in its bearing in a particularly smooth-running manner. This is particularly advantageous when the valve is supposed to respond particularly rapidly, or when the valve is supposed to respond to very low pressures.

Preferably, the slide bore has a diameter that is greater than that of the passage channel. As a result of this, the slide is able to completely block the passage channel.

As a result, an open/shut-valve is obtained. If only a reduction of the passage channel is desired, the slide portion may be provided with a peripheral groove or the diameter of the slide channel may be selected smaller than the diameter of the passage channel.

In order to bias the slide resiliently toward the open position of the valve, preferably a spring is provided which is arranged in the chamber that is divided by the head, said chamber being vented or provided with an oil discharge line.

This spring is configured as a compression spring pushing with its one end against the head and with its other end against an abutment, said abutment consisting, for example, of a screw used for closing the respective chamber. In an improved embodiment, this screw may be used as a setting screw in order to be able to affect the release pressure of the slide valve.

The spring is preferably pre-tensioned such that it will not respond for a long time if pressure increases gradually in order to then achieve a sudden movement of the slide in blocking direction.

The blocking portion preferably has a diameter which is slightly smaller than that of the section of the slide bore receiving the head, so that the slide bore having the blocking section defines the damping gap. This minimizes time delays when the valve is closed in the event of a pressure drop, i.e., when a drop below the switching pressure occurs. Optionally, the damping gap communicates with the working chamber, divided by the blocking portion via the channel leading through the blocking portion, in order to thus decompress said working chamber in the event the pressure in the passage channel drops. However, it is not absolutely necessary for the channel to extend through the blocking portion. The channel may also be provided in the valve housing.

The deactivation time of the valve is then not dependent on the size of the damping gap.

The inventive slide valve may be provided in a hydraulic system between a hydraulic pump and a load or, more precisely, between a hydraulic pump and a main valve block upstream of the load, said valve block activating and deactivating resonators. Preferably, the resonators are arranged between the pump and the load or between the pump and the main valve block, and are used to dampen pressure pulsations. Pulsations occur, for example, with the application of greater loads when the pump is connected partially or completely with the load via the main valve block. In this case, the slide valve may achieve a rapid switching of the damping resonators. This may occur independent of the material flow transported by the pump, said flow not being a function of the main valve block but, at most, of the pump rate.

Additional details of advantageous inventive embodiments result from the drawings, the description or the subclaims.

The drawings show examples of the invention. They show in

FIG. 1 a schematic illustration of a hydraulic system comprising an inventive slide valve;

FIG. 2 a schematic illustration, in longitudinal portion, of the slide valve in accordance with FIG. 1, in open position;

FIG. 3 the slide valve in accordance with FIG. 2, in closed position;

FIG. 4 a schematic illustration, in longitudinal section, of a modified embodiment of a slide valve, in open position; and, FIG. 5 the slide valve in accordance with FIG. 4, in closed position.

FIG. 1 shows a hydraulic system 1, which includes a hydraulic pump and a user or a load 3, for example, in the form of a hydraulic cylinder.

Hydraulic system 1 may be a power-assisted steering system of a motor vehicle or an otherwise comparable system.

In addition, hydraulic system 1 comprises, for example, two dampers 4, 5, which, for example, are designed as resonator dampers. On their output side, dampers 4, 5 are arranged parallel and connected with a main valve block 6. Said valve block comprises an inlet communicating with the two dampers 4, 5, an outlet leading to load 3 and another outlet leading to a return line 7. The latter is connected with the suction connection of hydraulic pump 2. Its pressure-side connection branches into damper 5, on the one hand, and into a slide valve 8, on the other hand, said slide valve being upstream of damper 4. Slide valve 8 is switched to open passage at relatively low pressures and blocks passage when a set pressure limit is exceeded. If the main valve block 6 connects the outlets of dampers 4, 5 directly with return line 7 and thus with the suction connection of hydraulic pump 2, slide valve 8 is set to open passage, so that both dampers 4, 5 are switched parallel. Referring to their flow resistance, dampers 4, 5 can be the same or can be different from each other. When connected parallel, their combined flow resistance is lower. In particular, damper 4 may display a particularly low flow resistance.

If main valve block 6 switches the outlets of dampers 4, 5 more or less to load 3, the pressure between load 3 and the outlet of hydraulic pump 2 increases.

If, in so doing, said pressure exceeds a limit, the slide valve performs its blocking function, thus rendering damper 4 inactive. The entire fluid stream demanded by hydraulic pump 2 now must pass through damper 5 which may exhibit a higher flow resistance and is designed to possibly completely dampen pulsations occurring under load. The now occurring flow resistance plays a subordinate part in view of energy losses in the hydraulic system 1, because this resistance occurs only temporarily.

FIGS. 2 and 3 show the design of slide valve 8 and will now be referred to.

Slide valve 8 has a valve housing 9 through which extends a passage channel 11 Said channel is designed, for example, as a straight cylindrical bore provided on each of its two opening with an internal thread 12, 13 in order to permit the connection of lines. In a direction transverse to passage channel 11 is a slide bore 14 which intersects passage channel 11 centrally and at right angles. Preferably, the diameter of slide bore 14 is at least as large as or larger than that of passage channel 11. If the diameter of slide bore 14 is smaller than that of passage channel 11, complete closure is not achieved when slide valve 8 performs its blocking function, but only a strong reduction of the passing flow is achieved. This, too, may be desirable.

Slide bore 14 has a first section 15, depicted below passage channel 11 in FIGS. 2 and 3, and a second section 16, depicted above passage channel 11 in FIGS. 2 and 3. The preferably cylindrical slide bore 14, in turn, is preferably configured as a pocket bore and hence closed on one end. On its open end, said pocket bore is closed, for example, by an adjusting screw or screw plug 17.

Slide bore 14 accommodates a slide 18, which is essentially rotation-symmetrical and supported such that it can be moved in a direction transverse to the passage channel. Slide 18 has a flat cylindrical and hence disk-like head 19 seated in section 15 of slide bore 14. The outside diameter of head 19 is slightly smaller than the diameter of slide bore 14. In so doing, said head is seated in a sealing yet sliding manner in said slide bore. On its side facing passage channel 11, head 19 has a flat annular surface or, as indicated in FIGS. 2 and 3, a saddle-shaped surface 21. Said surface may be configured in such a manner that it, as illustrated by the position of slide 18 in FIG. 2, rests snugly against the cylindrical wall of the passage channel in order to cause minimal disruption to the flow at this point and thus to produce low flow resistance.

A pin portion 22 projects centrally from head 19, said pin portion preferably being connected in one piece with head 19.

Pin portion 22 has a diameter which is substantially smaller than that of head 19. Said pin portion's diameter is selected such that it impairs the clear flow cross-section of passage channel 11 as little as possible. The length of pin portion 22 corresponds preferably to the diameter of passage channel 11. On its end away from head 19, pin portion 22 has, preferably molded in one piece to said pin portion 22, a blocking portion 23 that is essentially configured as a cylindrical plunger and is seated in section 16 of the overall cylindrical bore 14 so as to be movable with minimal play in axial direction. Said blocking portion's length is greater than the diameter of passage channel 11 and thus also longer than pin portion 22. On its side facing passage channel 11, blocking portion 23 has a flat annular surface or, as depicted in FIGS. 2 and 3, a saddle-shaped annular surface 24, which encloses pin portion 22 and which follows the cylindrical contour of the wall of passage channel 11. Consequently, annular surface 24 adjoins the wall of passage channel 11 in a smooth and stepless manner when slide 18 is in the position shown in FIG. 2.

Two or more channels 25, 26 traverse head 19 in longitudinal direction. Thus, these channels lead out of passage channel 11 into a chamber 27 which is divided by blocking portion 23 into section 16 of slide bore 14. Blocking portion 23 comprises a flat end surface, creating a boundary for the chamber.

In section 15 of slide bore 14, head 19 divides a chamber 28, in which a compression spring 29 is arranged. This compression spring abuts with its one end against the abutting surface of head 19 and with its other end against adjusting screw or screw plug 17. Chamber 28 may be vented toward the outside, for example, by a not specifically illustrated central bore of the adjusting screw or screw plug, or by another channel. Head 19 is preferably supported sealed in slide bore 14. To do so, said head has on its outer cylindrical generated surface a ring groove to accommodate a gasket element, for example an O-ring 20. Instead of a sealing element, lip seals or other sealing elements may be provided. In order to support the O-ring or another sealing element, a back-up ring may be provided, said back-up ring not being shown. However, if head 19 is not sealed fluid-tight with respect to the wall of slide bore 14, chamber 28 is connected with an oil discharge line leading to the suction connection of hydraulic pump 2.

The slide valve 8 that has been described so far operates as follows:

If fluid is present in passage channel 11 at low pressure, slide 18 is in the position depicted in FIG. 2. Pressure spring 29 holds the slide in its upper position, said position being a passage position. The hydraulic fluid fills passage channel 11, as well as channels 25, 26 and chamber 27. However, due to the sealed seat of head 19, said fluid cannot enter into chamber 28. A force generated by the fluid pressure, said fluid pressure being calculated based on the fluid pressure and the circular surface described by head 19, is applied against the force of pressure spring 29. This is because the fluid pressure acts counter to the force of pressure spring 29 to the extent that said fluid pressure acts on surface 21, as well as on a portion of the upper abutting surface of blocking portion 23. The outer annular zone of the latter is counterbalanced by annular surface 24, whereas a surface area corresponding to the area of the cross-section of pin portion 22 remains without counter-balance and thus contributes to the force in opening direction.

If the flow, i.e., the flow rate in passage channel 11, increases, a reduced pressure acts on surface 21 as well as on annular surface 24. Via channels 25, 26, this reduced pressure has also a pressure-reducing effect in chamber 27, so that slide 18 is held even more securely in open position. Consequently, an increased flow cannot result in the sudden and undesired closing of slide valve 8.

However, if the static pressure in passage channel 11 increases beyond a pressure limit used as switching limit, the slide moves into the position as in FIG. 3. This is achieved when the pressure acting on the cross-section of head 19 generates a force that exceeds the force of compression spring 29. This latter force is applied until the lower edge of blocking portion 23 has reached the lower limit of passage channel 11. In so doing, blocking portion 23, as illustrated by FIG. 3, can completely separate an annular chamber 21 enclosing pin 22 from passage channel 11. If this is the case, the fluid received by chamber 27 and by chamber 31, as well as by channels 25, 26, is essentially depressurized. In this state, compression spring 29 is no longer opposed by any force. Consequently, slide 18 retracts until chamber 31 is just barely closed by passage channel 11. A damping gap 32 having reached a value of zero at the point illustrated in FIG. 3 is created between the outside circumference of blocking portion 23 and the internal wall of section 15 of slide bore 14. This point is determined by a virtual plane, which includes the axis of passage channel 11, as well as the axis of slide bore 14. This plane marks a line on the wall of passage channel 11, as well as on the convex surface of blocking section 23. The meeting point of these lines is exactly that point at which the damping gap reaches the value of zero. This position is automatically controlled by slide 18 as long as the pressure in passage channel 11 exceeds the switch-off value. As long as this is the case, this pressure is also transmitted to chamber 31 via the damping gap 32 that has been adjusted to zero by this pressure. If, however, the pressure drops below this switching pressure, chamber 31 and, with it chamber 27, are also depressurized via damping gap 32, as a result of which compression spring 29 returns slide 18 back into its home position of FIG. 2 without any disruptive time delay. Now, passage channel 11 has again been cleared.

FIGS. 4 and 5 show a modified embodiment of inventive slide valve 8. Insofar as these two figures use the same reference numbers as the above-described figures, the description and the design, as well as the function, apply correspondingly.

The differences are explained as follows:

Chamber 28 is provided with a depressurizing bore 33, which, when the bearing of head 19 is sealed, is open toward the outside and otherwise leads to an oil-collecting line. If necessary, as already explained in conjunction with FIGS. 2 and 3, head 19 may be sealed relative to slide bore 14 by means of a sealing element, for example, an O-ring. However, said head may be seated in slide bore 14, even with a slight leak, when decompression bore 33 is connected to an oil-collecting line.

Furthermore, blocking portion 23 does not have channels 25, 26. They are replaced by a bypass channel 34 leading from passage channel 11 into chamber 27.

As in the above-described embodiment, the surfaces (surface 21 and annular surface 24) coming into contract with the flow are in parallel alignment with the flow, and thus in parallel alignment with the wall of passage channel 11, in such a manner that the just occurring flow through passage channel 11 does not apply a combined force on these surfaces. In so doing, surface 21 is arranged symmetrically to annular surface 24 and relative to a central plane which intersects pin portion 22 at right angles. Thus, any force generated on the surface as a result of the flow is consequently relieved by an equal force directed in opposite direction, said latter force being generated on annular surface 24.

This applies in the same manner to the above-described embodiment. Considering this, pin portion 22 has also a cylindrical shape.

Bypass channel 34, like channels 25, 26, branches off passage channel 11 in transverse direction and thus transmits the static pressure acting on the wall to chamber 27.

In view of the function, there is a difference such that chamber 27 in blocked state of slide valve 8 (FIG. 5) is not subjected to the static pressure via damping gap 32 but us subjected to such pressure directly via bypass channel 34. Therefore, blocking portion 23 can be moved unimpaired in blocking direction until head 19 locates an abutment. Said abutment may, for example, be provided on adjusting screw or screw plug 17. Likewise, the depressurization of chamber 27 takes place via bypass channel 34.

As in the above-described example, in open position, a certain suction acts on chamber 27 via bypass channel 34 if the flow rate through passage channel 11 is high. However, as the blocking operation begins, this suction decreases, thus eliminating the force that has held slide 18 in open position up to that time and has supported compression spring 29. This elimination of force leads to a suddenly activating closure of slide valve 8. In the same way, the flow through passage channel 11 accelerates the opening operation when said channel is opened. Therefore, the slide valve closes rapidly and precisely. Intermediate positions which could cause vibration or noise phenomena are avoided.

The inventive slide valve 8 comprises a slide 18 which is supported such that it can be moved in a direction transverse to passage channel 11. It has an asymmetrical configuration such that pressure prevailing in passage channel 11 can be transmitted through suitable channels 25, 26, 34 to one side of slide 18, while the other side is not subjected to pressure or to a constant low pressure. A spring 29 holding slide 18 in open position counteracts said pressure. If the fluid pressure prevails, slide 18 is moved into blocking position where it remains until the pressure again drops below the switching limit.

The invention claimed is:

1. A hydraulic system including a hydraulic pump, a load, an actuator for moving the load, a control valve fluidly connected to the actuator, at least two branches parallel to each other and fluidly connected between the hydraulic pump and the control valve with each branch including at least one damper, and at least one slide valve arranged in one of the branches, the slide valve comprising:
   a valve housing having a passage channel with a slide bore extending in a direction transverse to the passage channel; and
   a slide supported within and longitudinally movable relative to the slide bore between an open position and a blocking position, the slide having a head, a blocking portion defining a blocking position when the blocking portion is aligned with the passage channel, and a pin portion connecting the head to the blocking portion and defining an open position when the pin portion is aligned with the passage channel, wherein the blocking portion divides the slide bore into a chamber,
   wherein at least one channel is provided that permits fluid communication between the chamber and the passage channel, thereby allowing the chamber to be subjected to the fluid pressure prevailing in the passage channel,
   wherein, when the pressure in the passage channel exceeds a predetermined fluid pressure, the slide moves to its blocking position.

2. The hydraulic system of claim 1, wherein the head is supported in a sealed manner in the slide bore.

3. The hydraulic system of claim 1, wherein the head divides the slide bore into a vented chamber.

4. The hydraulic system of claim 1, further including a compression spring to pre-tension the slide, the spring including a first end abutting the head and a second end abutting an abutment.

5. The hydraulic system of claim 4, wherein the abutment is adjustable.

6. The hydraulic system of claim 4, wherein the compression spring is arranged in the chamber.

7. The hydraulic system of claim 1, wherein the blocking portion is connected to the head by a pin portion having a diameter that is smaller than a diameter of the blocking portion.

8. The hydraulic system of claim 1, wherein the blocking portion has a diameter which is slightly smaller than a diameter of a section of the slide bore accommodating the head, such that the slide bore defines a damping gap with the blocking portion when the blocking portion is moved toward the blocking position.

9. The hydraulic system of claim 1, wherein the diameter of the slide bore is at least as large as the diameter of the passage channel.

10. The hydraulic system of claim 1, further comprising a compression spring for providing a spring force that urges the slide toward the open position against the fluid pressure in the passage channel, wherein the spring force is sized such that:
   when the fluid pressure prevailing within the passage channel is less than the predetermined fluid pressure, the slide remains in its open position, and
   when the fluid pressure prevailing within the passage channel is greater than the predetermined fluid pressure, the slide moves to its blocking position.

11. The hydraulic system of claim 1, wherein the at least one channel is provided in the blocking portion of the slide.

12. The hydraulic system of claim 1, wherein the at least one channel includes a bypass channel provided in the valve housing upstream from the slide.

13. A hydraulic system comprising:
   a hydraulic pump,
   an actuator for moving a load;
   a control valve fluidly connected to the actuator;
   at least two branches fluidly connected between the pump and the control valve, each branch including at least one damper; and
   a pressure sensitive, shut-off valve provided in one of the branches, the shut-off valve including:
      a valve housing having a passage channel with a slide bore extending in a direction traverse to the passage channel, and
      a slide supported in the slide bore so as to be moveable in the traverse direction within the slide bore between an open position permitting flow through the passage channel and a closing position preventing flow through the passage channel,
      wherein the slide is configured to switch from its open position to its closed position when the pressure in the passage channel exceeds a predetermined pressure limit.

14. The hydraulic system of claim 13, wherein the shut-off valve is provided between the pump and the damper.

15. The hydraulic system of claim 13, wherein the slide includes a head, a blocking portion that defines the blocking position, and a pin portion that connects the head to the blocking portion and defines the open position.

16. The hydraulic system of claim 15, wherein the blocking portion divides the slide bore into a chamber, wherein at least one channel is provided that permits fluid communication between the chamber and the passage channel, thereby allowing the chamber to be subjected to the fluid pressure prevailing in the passage channel,
   wherein, when the pressure in the passage channel exceeds a predetermined pressure limit, the slide moves from its open position to its blocking position.

17. The hydraulic system of claim 16, wherein the at least one channel is provided in the blocking portion of the slide.

18. The hydraulic system of claim 16, wherein the at least one channel includes a bypass channel provided in the valve housing.

19. The hydraulic system of claim 13, further comprising a compression spring for providing a spring force that urges the slide toward the open position against the fluid pressure in the passage channel, wherein the spring force is sized such that:
   when the pressure prevailing within the passage channel is less than the predetermined pressure limit, the slide remains in its open position, and
   when the pressure prevailing within the passage channel is greater than the predetermined pressure limit, the slide moves from its open position to its blocking position.

* * * * *